United States Patent
Chung et al.

(10) Patent No.: US 12,441,654 B2
(45) Date of Patent: Oct. 14, 2025

(54) POROUS GLASS NANOPARTICLES AND DENTIN ADHESIVE COMPOSITION COMPRISING SAME

(71) Applicant: MEDICLUS, Chungcheongbuk-do (KR)

(72) Inventors: Ki Nam Chung, Daejeon (KR); Jae Seok Song, Chungcheongbuk-do (KR); Gyu Young Kim, Chungcheongbuk-do (KR)

(73) Assignee: MEDICLUS, Chungcheongbuk-Do (KR)

( * ) Notice: Subject to any disclaimer, the term of this patent is extended or adjusted under 35 U.S.C. 154(b) by 390 days.

(21) Appl. No.: 18/021,020

(22) PCT Filed: Mar. 31, 2022

(86) PCT No.: PCT/KR2022/004603
§ 371 (c)(1),
(2) Date: Feb. 13, 2023

(87) PCT Pub. No.: WO2022/231144
PCT Pub. Date: Nov. 3, 2022

(65) Prior Publication Data
US 2023/0303429 A1    Sep. 28, 2023

(30) Foreign Application Priority Data
Apr. 27, 2021 (KR) .......... 10-2021-0054049

(51) Int. Cl.
*C03C 11/00* (2006.01)
*A61K 6/30* (2020.01)
*A61K 6/60* (2020.01)

(52) U.S. Cl.
CPC .......... *C03C 11/00* (2013.01); *A61K 6/30* (2020.01); *A61K 6/60* (2020.01)

(58) Field of Classification Search
CPC .......... C03C 11/00; A61K 6/30; A61K 6/60
See application file for complete search history.

(56) References Cited

U.S. PATENT DOCUMENTS

| | | | | |
|---|---|---|---|---|
| 5,332,429 A | * | 7/1994 | Mitra | .......... C07F 7/0836 106/35 |
| 9,517,186 B2 | * | 12/2016 | Rusin | .......... A61C 7/00 |

FOREIGN PATENT DOCUMENTS

| | | | |
|---|---|---|---|
| JP | 2019-065293 A | | 4/2019 |
| KR | 10-2004-0078363 A | | 9/2004 |
| KR | 10-0814730 B1 | | 3/2008 |
| KR | 10-2016-0073811 A | | 6/2016 |
| KR | 10-1865484 B1 | | 6/2018 |
| KR | 10-2020-0003768 A | | 1/2020 |
| KR | 10-2020-0007537 A | | 1/2020 |
| KR | 202000003768 A | * | 1/2020 |
| KR | 10-2020-0053083 A | | 5/2020 |

OTHER PUBLICATIONS

KR 202000003768 A, English translation provided by EPO (Year: 2025).*
International Search Report for PCT/KR2022/004603 mailed on Aug. 3, 2022.
Office action issued on Aug. 24, 2023 from Korean Patent Office in a counterpart Korean Patent Application No. 10-2021-0054049 (English translation is also submitted herewith.).

* cited by examiner

*Primary Examiner* — Michael P Cohen
(74) *Attorney, Agent, or Firm* — PLEECHAE IP, LLC

(57) ABSTRACT

Porous glass nanoparticles according to an embodiment have a specific surface area of 250 m2/g to 800 m2/g, and a pore volume of 0.1 cm3/g to 1 cm3/g. Since the porous glass nanoparticles have a high specific surface area and pore volume, the porous glass nanoparticles may have improved agilities to remineralize the demineralized dentin and occlude dentinal tubules. In addition, by including the porous glass nanoparticles, a dentin adhesive composition with improved adhesive strength to the dentin surface may be provided.

17 Claims, 4 Drawing Sheets

POROUS GLASS NANOPARTICLES AND DENTIN ADHESIVE COMPOSITION COMPRISING SAME

CROSS-REFERENCE TO RELATED APPLICATION AND CLAIM OF PRIORITY

This application claims benefit under 35 U.S.C. 119, 120, 121, or 365 (c), and is a National Stage entry from International Application No. PCT/KR2022/004603 filed on Mar. 31, 2022, which claims priority to Korean Patent Application No. 10-2021-0054049 filed on Apr. 27, 2021, in the Korean Intellectual Property Office (KIPO), the disclosure of which are herein incorporated by reference in its entirety.

BACKGROUND

1. Technical Field

The present invention relates to porous glass nanoparticles and a dentin adhesive composition including the same. More specifically, the present invention relates to porous glass nanoparticles having bioactivity and a dentin adhesive composition including the porous glass nanoparticles.

2. Description of the Related Art

Dentin contains an inorganic matter called hydroxyapatite, collagen and moisture, and an organic matter such as phosphorene is formed between hydroxyapatite and collagen bundles. In addition, the dentin includes a dentinal tubular structure having upper and lower portions with different inner diameters from each. For adhesion to dentin, chemical bonding with the above-described components of the dentin and a mechanical method of penetrating an adhesive component into the tubular structure to form a plug are used together.

Specifically, adhesion to the dentin is performed via steps of, for example, an acid-etching treatment through an etching gel, a pre-treatment through a hydrophilic primer, and adhesion using a bonding agent. In the case of the conventional dentin adhesive, problems have been brought up in an aspect that there are somewhat inconvenient to use the adhesive as the above-described several steps are sequentially performed, and durability and stability of the adhesive are reduced since the surgical operation takes a long time. Accordingly, development of an adhesive composition capable of simultaneously performing adhesion mechanisms to the dentin is required.

However, unlike enamel mainly composed of inorganic matters, dentin contains a large amount of organic matters, and since a bonding surface is maintained in a wet state due to the exposed dentinal tubules, the bonding mechanism may be complicated. In addition, various factors such as a composition of dentin, a smear layer, moisture, pH, and an amount of residual minerals may affect an adhesive force of the dentin adhesive. Therefore, in order to effectively adhere the adhesive to the dentin surface, the above-described properties should be considered, and for example, various properties such as wettability, acidity, permeability, mechanical strength, and the like are required in the dentin adhesive.

Korean Patent Laid-Open Publication No. 10-2004-0078363 discloses an example of a photocuring dental adhesive composition.

SUMMARY

An object of the present invention is to provide porous glass nanoparticles having improved remineralization property and mechanical property.

Another object of the present invention is to provide a dentin adhesive composition including the porous glass nanoparticles.

To achieve the above objects, according to an aspect of the present invention, there are provided porous glass nanoparticles having a specific surface area of 250 to 800 $m^2/g$, and a pore volume of 0.1 to 1 $cm^3/g$.

In some embodiments, pores of the porous glass nanoparticles may have an average diameter of 2 to 50 nm.

In some embodiments, the pores having a diameter of 5 to 20 nm may be included in 50% or more of all pores of the porous glass nanoparticles.

In some embodiments, the porous glass nanoparticles may have an average particle diameter ($D_{50}$) of 30 to 100 nm.

In some embodiments, the porous glass nanoparticles may include at least one selected from the group consisting of Si, Ca, Cu, Mg, Na, K, P, Al, B and F.

In some embodiments, the porous glass nanoparticles may include at least one selected from the group consisting of $SiO_2$, CaO, CuO, MgO, $Na_2O$, $K_2O$, $P_2O_5$, $Al_2O_3$, $B_2O_3$, NaF and $CaF_2$.

In some embodiments, the porous glass nanoparticles may be surface-modified with a silane group or an amine group ($—NH_2$).

According to another aspect of the present invention, there is provided a dentin adhesive composition including the above porous glass nanoparticles, an acidic monomer, a polymerizable monomer and a photo-initiating system.

In some embodiments, the acidic monomer may have at least one of a carboxyl group, a sulfonic acid group, a phosphoric acid group and an acid anhydride group.

In some embodiments, the polymerizable monomer may include a (meth)acrylate compound.

In some embodiments, the photo-initiating system may include a photo-initiator and a reducing agent.

In some embodiments, the photo-initiating system may include the photo-initiator and the reducing agent in a weight ratio of 20:80 to 80:20.

In some embodiments, a content of the porous glass nanoparticles may be 0.01 to 15% by weight based on a total weight of the dentin adhesive composition.

In some embodiments, the dentin adhesive composition may include: 0.1 to 20% by weight of the acidic monomer: 30 to 80% by weight of the polymerizable monomer; and 0.1 to 5% by weight of the photo-initiating system, based on the total weight thereof.

In some embodiments, the dentin adhesive composition may further include at least one of a silane coupling agent, a pH adjuster, an antioxidant and a solvent.

In some embodiments, the dentin adhesive composition may have a viscosity of 10 to 40 cP at 25° C.

In some embodiments, the dentin adhesive composition may have a pH of 2 to 5.

The porous glass nanoparticles according to embodiments of the present invention have high specific surface area and pore volume, thereby it is possible to provide improved adhesive strength to the tooth surface with improved remineralization property of dentin.

In addition, since the porous glass nanoparticles have pores of a predetermined size, formation of hydroxyapatite (HAp) at an interface between the dentin and the adhesive may be facilitated, and adhesion or wettability to the tooth surface may be enhanced.

Further, since the dentin adhesive composition according to exemplary embodiments of the present invention includes the porous glass nanoparticles, it may have improved remineralization of teeth and dentinal tubule occluding ability, as well as low viscosity and high adhesive strength.

Furthermore, since the dentin adhesive composition includes an acidic monomer, a polymerizable monomer and a photo-initiating system, etching, pretreatment and adhesion mechanism of remineralization may be performed together. Accordingly, the surgical operation may be simplified, and a cured adhesive having improved durability and adhesive force may be provided.

DETAILED DESCRIPTION OF THE EMBODIMENTS

Figure 1A:
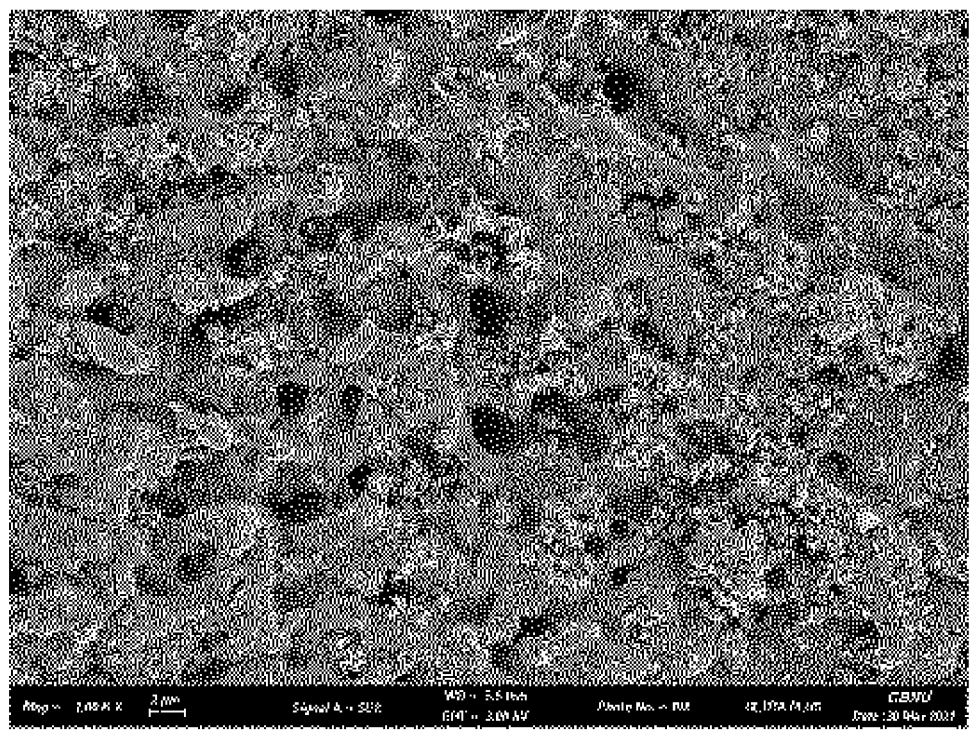
FIGS. 1A and 1B are scanning electron microscopy (SEM) photographs taken by observing the dentin surface cured after applying a porous glass nanoparticle-containing aqueous solution according to Synthesis Example 1 of the present invention at 1000× magnification and 2000× magnification, respectively.

According to embodiments of the present invention, there are provided bioactive glass nanoparticles having a specific surface area in a range of 250 to 800 $m^2/g$ and a pore volume in a range of 0.1 to 1.0 $cm^3/g$. Since the glass nanoparticles have the specific surface area and pore volume within the above range, they may have improved remineralization property to the dentin.

In addition, there is provided a dentin adhesive composition including the above porous glass nanoparticles. Since the dentin adhesive composition includes the glass nanoparticles having the specific surface area and pore volume within the above range, it may have improved adhesive force, and improved adhesive strength at an interface between the adhesive composition and the dentin.

Hereinafter, porous glass nanoparticles and an adhesive composition including the same according to embodiments of the present invention will be described in detail.

<Porous Glass Nanoparticles>

Porous glass nanoparticles according to embodiments of the present invention may have a specific surface area of 250 $m^2/g$ or more and a pore volume of 0.1 $cm^3/g$ or more.

The porous glass nanoparticles may mean ion-releasing glass particles capable of inducing a specific biological action in biological tissues, and may be composed of inorganic matters. For example, the porous glass nanoparticles may play a role of providing an inorganic component for remineralization of dentin.

For example, for mechanical adhesion between a tooth surface and the adhesive, it is necessary to remove a smear layer from the tooth surface and demineralize the tooth. However, when an acid etching agent or an acid etchant is used to remove the smear layer or demineralize the dentin, proteolytic enzymes such as matrix metalloproteinases (MMPs) may be activated during demineralizing the dentin. In this case, the activated proteolytic enzyme may facilitate decomposition of collagen (e.g., collagen fibers) included in the dentin, and thereby, durability and adhesive strength of the adhesive may be reduced.

The porous glass nanoparticles according to an exemplary embodiment may transfer minerals such as calcium, silicate, phosphorus, copper, and the like required for remineralization to the demineralized dentin, thus to facilitate dentin regeneration. For example, when the dentin is remineralized, shielding properties for dentinal tubules may be increased, and dissolution of collagen fibers exposed due to the acid etching agent by the proteolytic enzymes may be suppressed. Accordingly, it is possible to prevent dentin from being corroded by the activated proteolytic enzymes, and improve oral stability and adhesive strength of the adhesive composition.

In addition, since the porous glass nanoparticles include a plurality of pores, a space for supporting ions to help in dimension regeneration may be additionally provided, and the adhesive composition including the porous glass nanoparticles may have improved mechanical strength.

The porous glass nanoparticles may have a high specific surface area of 250 $m^2/g$ or more. For example, the porous glass nanoparticles may have a specific surface area in a range of 250 to 800 $m^2/g$. Preferably, the porous glass nanoparticles may have a specific surface area in a range of 450 to 800 $m^2/g$, and more preferably 550 to 750 $m^2/g$. For example, the specific surface area may be measured by the Brunaucr-Emmett-Teller (BET) method.

The porous glass nanoparticles have a high specific surface area within the above range, such that they may have improved ion transport/release efficiency per unit weight. In this case, an amount of the inorganic component supplied to the dentin may be increased due to the porous glass nanoparticles, and formation of hydroxyapatite (HAp), which is a main component of dentin, may be facilitated. Accordingly, the adhesive attached to the dentin surface may have improved mechanical durability, and the adhesive may have improved adhesive force to the dentin tissue.

For example, if the specific surface area of the porous glass nanoparticles is less than 250 $m^2/g$, ion release ability of the porous glass nanoparticles may be decreased, and remineralization property and adhesive strength may be reduced. For example, if the specific surface area of the porous glass nanoparticles is greater than 800 $m^2/g$, mechanical and chemical properties of the porous glass nanoparticles may be reduced, and mechanical strengths of the adhesive composition and the cured product may be decreased.

The porous glass nanoparticles may have a pore volume of 0.1 $cm^3/g$ or more. For example, the porous glass nanoparticles may have a pore volume in a range of 0.1 to 1 $cm^3/g$, and preferably 0.3 to 0.7 $cm^3/g$. In this case, the pore volume may be measured using a BET measuring device, for example.

When the porous glass nanoparticles have a high pore volume as described above, the adhesive may have improved adhesive strength to the dentin. For example, a polymerizable monomer to be described below may play a role of an anchor between the dentinal tubules and the pores of porous glass nanoparticles, and thereby, adhesive force of the porous glass nanoparticles to the dentin may be improved.

For example, when the porous glass nanoparticles have a high pore volume of 0.1 cm$^3$/g or more, the amount of the polymerizable monomer interposed inside the porous glass nanoparticles through the pores may be increased. In this case, during a curing reaction, the porous glass nanoparticles may be strongly bonded to the tooth surface by the polymerizable monomers densely disposed inside the pores. If the pore volume is greater than 1 cm$^3$/g, since the density of the porous glass nanoparticles is decreased, abilities to release and supply inorganic components may be decreased, and mechanical stability of the porous glass nanoparticles may be reduced.

According to exemplary embodiments, the pores of the porous glass nanoparticles may have an average diameter of about 2 to 50 nm, preferably 2 to 25 nm, and more preferably 2.5 to 10 nm. The average diameter of the pores may be calculated as an arithmetic mean value after measuring the diameters of the pores on the surface of the porous glass nanoparticles. For example, the diameter of the pore may mean the longest diameter of the pore.

Within the above range, the porous glass nanoparticles may have improved mechanical strength maintained in a proper range, and the polymerizable monomer may be easily adsorbed into the porous glass nanoparticles through the pores.

For example, if the average diameter of the pores is less than 2 nm, the amount of polymerizable monomers inserted into the pores of the porous glass nanoparticles is reduced, such that the durability and adhesive strength of the cured adhesive may be reduced. If the average diameter of the pores is greater than 50 nm, the mechanical and chemical properties of the porous glass nanoparticles may be reduced.

In some embodiments, pores having a diameter of 5 to 20 nm may be included in 50% or more, and preferably 80% or more of all pores of the porous glass nanoparticles. The porous glass nanoparticles include 50% or more of pores having a size of 5 nm or more, so that adsorption/release properties of inorganic ions may be improved, and the adhesive force of the adhesive composition may be enhanced.

According to exemplary embodiments, the porous glass nanoparticles may have an average particle diameter ($D_{50}$) of 30 to 100 nm, and preferably 50 to 100 nm. The average particle diameter ($D_{50}$) may mean a particle diameter at 50% of a volume fraction in a particle diameter cumulative distribution of the porous glass nanoparticles.

If the average particle diameter of the porous glass nanoparticles is less than 30 nm, the viscosity of the adhesive composition is increased, such that permeability and wettability into the dentin may be decreased, and adhesive force to the dentin may be reduced. If the average particle diameter of the porous glass nanoparticles is greater than 100 nm, the porous glass nanoparticles may be precipitated in the composition, and the remineralization property of dentin may be reduced.

According to exemplary embodiments, the porous glass nanoparticles may include inorganic components such as silicon (Si), calcium (Ca), copper (Cu), magnesium (Mg), sodium (Na), potassium (K), phosphorus (P) aluminum (Al), boron (B), fluorine (F), and the like. For example, the porous glass nanoparticles may include $SiO_2$, $CaO$, $CuO$, $MgO$, $Na_2O$, $K_2O$, $P_2O_5$, $Al_2O_3$, $B_2O_3$ or the like. These may be used alone or in combination of two or more thereof.

As the inorganic components are continuously released/eluted from the porous glass nanoparticles, ions such as calcium or silicon, etc. may be supplied to the teeth. Accordingly, the inorganic components may be deposited on the dentin surface, thereby resulting in the formation of hydroxyapatite (HAp) on the dentin surface.

Preferably, the porous glass nanoparticles may include $CaO$, $P_2O_5$ and $SiO_2$. For example, the porous glass nanoparticles may include 0.5 to 40 mol % of calcium (Ca), 0.1 to 10 mol % of phosphorus (P), and 4 to 90 mol % of silicon (Si). In this case, mechanical strength and stability of the porous glass nanoparticles may be improved, and dentin regeneration at the interface between the adhesive and the teeth may be further facilitated.

In some embodiments, the porous glass nanoparticles may be surface-modified with a silane group or an amine group ($-NH_2$). For example, the silane group or the amine group may be disposed on the surface of the above-described inorganic particles.

In this case, the porous glass nanoparticles may form a covalent chemical bond with the polymerizable monomer (e.g., (meth)acrylate compound) included in the adhesive composition through the silane group or the amine group. Accordingly, the porous glass nanoparticles may be easily incorporated into the adhesive composition and may have improved dispersibility in the composition.

<Dentin Adhesive Composition>

The dentin adhesive composition according to embodiments of the present invention may include the porous glass nanoparticles according to exemplary embodiments. In one embodiment, the dentin adhesive composition may further include an acidic monomer, a polymerizable monomer and a photo-initiating system.

When the dentin adhesive composition includes the porous glass nanoparticles, it is possible to have improved remineralization property to the dentin, and improve a bonding strength between the tooth surface and the adhesive. Therefore, the composition may have improved abilities to regenerate the carious dentin and abilities to occlude the exposed dentinal tubules.

In some embodiments, a content of the porous glass nanoparticles may be about 0.01 to 15% by weight ("wt. %") based on a total weight of the dentin adhesive composition. If the content of the porous glass nanoparticles is less than 0.01 wt. %, the inorganic components transferred to the dentin is insufficient, such that hydroxyapatite (HAp) may not be sufficiently formed. If the content of the porous glass nanoparticles is greater than 15 wt. %, the porous glass nanoparticles having a large volume may be excessively included in the adhesive composition, thereby resulting in an increase in the viscosity of the adhesive composition.

Preferably, the content of the porous glass nanoparticles may be 0.1 to 10 wt. %, and more preferably 1 to 7 wt. % based on the total weight of the dentin adhesive composition. Within the above range, the viscosity of the adhesive composition may be maintained low, and the adhesive composition may have improved application and remineralization properties.

The acidic monomer may remove the smear layer on the tooth surface and demineralize the tooth to facilitate the mechanical bonding and chemical bonding between the tooth and the adhesive.

For example, when the dentin surface is demineralized by the acidic monomer, a collagen layer may be exposed, and when the adhesive composition penetrates the exposed collagen layer, adhesive strength between the tooth and the adhesive may be improved. In addition, the acidic monomers may remove contaminants present on the dentin surface.

When the dentin adhesive composition includes the acidic monomer, the adhesive composition may not include a separate acid etching agent or primer treatment agent. Therefore, acid etching and washing/drying processes may be omitted, and postoperative hypersensitivity and reduction in storage stability of the adhesive composition due to the acid etching agent or primer treatment agent may be prevented.

In some embodiments, the acidic monomer may include a functional group such as a carboxyl group, a phosphoric acid group, a sulfonic acid group, an acid anhydride group or the like. For example, the acidic monomer may include a carboxyl group-containing monomer, a phosphoric acid group-containing monomer, a sulfonic acid group-containing monomer or the like. These may be used alone or in combination of two or more thereof.

Examples of the carboxyl group-containing acidic monomer may include 4-(meth)acryloyloxymethyl trimellitic acid, 4-(meth)acryloyloxyethyl trimellitic acid, 4-(meth)acryloyloxypropyl trimellitic acid, 4-(meth)acryloyloxybutyl trimellitic acid, 4-(meth)acryloyloxypentyl trimellitic acid, 4-(meth)acryloyloxyhexyl trimellitic acid, 4-(meth)acryloyloxyoctyl trimellitic acid or anhydrides thereof, etc.

Examples of the phosphoric acid group-containing acidic monomer may include 2-(meth)acryloyloxyethyl dihydrogen phosphate, 3-(meth)acryloyloxypropyl dihydrogen phosphate, 4-(meth)acryloyloxybutyl dihydrogen phosphate, 8-(meth)acryloyloxy butyl dihydrogen phosphate, 10-(meth)acryloyloxybutyl dihydrogen phosphate, 12-(meth)acryloyloxybutyl dihydrogen phosphate, bis [2-(meth)acryloyloxyethyl] hydrogen phosphate, 2-(meth)acryloyloxyethylphenyl hydrogen phosphate or 2-(meth)acryloyloxyethyl p-methoxyphenyl hydrogen phosphate, etc.

Examples of the sulfonic acid group-containing acidic monomer may include styrenesulfonic acid, 2-(meth)acrylamide-2-methylpropane sulfonic acid, sulfopropyl (meth)acrylate, or (meth)acryloyloxynaphthalene sulfonic acid, etc.

Preferably, the acidic monomer may include 4-methacryloyloxyethyl trimellitic acid (4-MET), 4-methacryloyloxyethyl trimellitate anhydride (4-META) and/or 10-methacryloyloxydecyl dihydrogen phosphate (10-MDP).

In some embodiments, the content of the acidic monomer may be 0.1 to 20 wt. %, and preferably 1 to 10 wt. % based on the total weight of the dentin adhesive composition. Within the above range, damage to the dentin due to excess acidic groups may be suppressed, as well as the adhesive composition may have improved adhesive strength, and the cured product may have improved durability and life-span characteristics.

The polymerizable monomer may improve adhesive force at the interface between the tooth and the adhesive, and improve penetration of the adhesive composition into the dentin. Therefore, the cured product of the adhesive composition may have improved strength and durability. In one embodiment, the polymerizable monomer may not contain the acidic group. Accordingly, the cured product may have improved mechanical strength and water resistance, and improved adhesive strength may be implemented even under extreme high temperature/humid conditions.

In some embodiments, the polymerizable monomer may include a (meth)acrylate compound. Examples of the polymerizable monomer may include methyl (meth)acrylate, ethyl (meth)acrylate, isopropyl (meth)acrylate, isobutyl (meth)acrylate, benzyl (meth)acrylate, glycerol di(meth)acrylate, glycerol tri(meth)acrylate, ethyleneglycerol di(meth)acrylate, 1,3-propandiol di(meth)acrylate, bisphenol A diglycidyl ether dimethacrylate (Bis-GMA), ethyleneglycol (meth)acrylate, ethyleneglycol di(meth)acrylate, triethyleneglycol di(meth)acrylate, urethane (meth)acrylate, urethane di(meth)acrylate or the like. These may be used alone or in combination of two or more thereof.

Preferably, examples of the polymerizable monomer may include ethyleneglycol methacrylate (HEMA) and/or urethane dimethacrylate (UDMA).

In some embodiments, the content of the polymerizable monomer may be 30 to 80 wt. %, and preferably 45 to 70 wt. % based on the total weight of the dentin adhesive composition. Within the above range, the cured product of the adhesive composition may have improved strength and mechanical properties, as well as improved adhesion to the dentin and life-span characteristics.

The photo-initiating system may play a role of initiating a polymerization reaction to cure/cross-link the dentin adhesive composition. For example, when the dentin adhesive composition is irradiated with light from a light source in a visible ray region, radicals are generated by the photo-initiating system, and a polymerization reaction of the above-described monomers may be initiated by the generated radicals.

In some embodiments, the photo-initiating system may include a photo-initiator and/or a reducing agent. For example, radical polymerization may be initiated by the photoexcited photo-initiator while the reducing agent is deprived of hydrogen.

For example, the photo-initiator may include benzyl, furyl, 3,3,6,6-tetramethylcyclohexanedione, pentanthraquinone, camphorquinone (CQ), 2,3-pentanedione, 1-phenyl-1,2-propanedione, 1-aryl-2-alkyl-1,2-ethanedione, 2-chlorothioxanthone, 2,4-diethylthioxanthone, cyclic α-diketone or the like. These may be used alone or in combination of two or more thereof.

For example, the reducing agent may include N,N-dimethylaminoethyl methacrylate (DMAEMA) and/or ethyl-4-dimethylamino benzoate (EDMAB).

In some embodiments, the amount of the photo-initiating system may be 0.1 to 5 wt. %, and preferably 0.1 to 3 wt. % based on the total weight of the dentin adhesive composition. If the content of the photo-initiating system is less than 0.1 wt. %, a polymerization rate of the adhesive composition may be reduced. If the content of the photo-initiating system is greater than 5 wt. %, a polymerization degree of the monomers is reduced as the polymerization rate is excessively fast, and thus the mechanical properties of the cured product may be deteriorated.

In some embodiments, the photo-initiating system may include the photo-initiator and the reducing agent in a weight ratio of 20:80 to 80:20, and preferably 40:60 to 60:40.

According to exemplary embodiments, the dentin adhesive composition may further include conventional additives, as necessary, in addition to the above-described components. For example, the dentin adhesive composition may further include a silane coupling agent, a pH adjuster, an antioxidant, a solvent or the like.

The pH adjuster may control the pH of the adhesive composition, and may buffer the pH change due to the oral environment. For example, the pH adjuster may include 2,2'-(p-tolylamino)-diethanol (TP).

In some embodiments, the amount of the pH adjuster may be 0.01 to 0.5 wt. % based on the total weight of the dentin adhesive composition. Within the above range, the pH of the adhesive composition may be controlled to a weakly acidic region, and the composition may have improved stability over time and activity.

In some embodiments, the pH of the dentin adhesive composition at room temperature may be 2 to 4, and preferably 3 to 3.5. Within the above range, the adhesive composition may have improved stability and the remineralization property due to the porous glass nanoparticles may be improved.

The silane coupling agent may improve the mechanical strength and chemical stability by coating the surface of the porous glass nanoparticles. Accordingly, the porous glass nanoparticles subjected to silane treatment may be stably dispersed and mixed in the adhesive composition. For example, the silane coupling agent may include chlorosilane, alkoxysilane and/or silazane, etc. In one embodiment, the content of the silane coupling agent may be 0.01 to 0.5 wt. % based on the total weight of the adhesive composition.

The antioxidant may prevent tooth corrosion by the adhesive composition. For example, the antioxidant may include 2,6-di-tert-butyl-4-methylphenol butylate (BHT). In one embodiment, the content of the antioxidant may be 0.01 to 0.5 wt. % based on the total weight of the adhesive composition.

The solvent may reduce the viscosity of the adhesive composition, and may have strong volatility thus to easily remove moisture contained in teeth. Examples of the solvent may include volatile solvents such as ethanol and acetone and/or water. The solvent may be included in the balance of the adhesive composition, and for example, the amount of the solvent may be 10 to 50 wt. % based on the total weight of the adhesive composition.

In some embodiments, the viscosity of the dentin adhesive composition measured at 25° C. may be 10 to 40 cP, and preferably 10 to 25 cP. When the adhesive composition has a low viscosity within the above range, the cured product may have improved wettability and application properties to the dentin surface and dentinal tubules, and have improved abilities to shield the collagen exposed to an outside, etc., and abilities to occlude the dentinal tubules.

Hereinafter, experimental examples including specific examples and comparative examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

SYNTHESIS EXAMPLES: POROUS GLASS NANOPARTICLES

Synthesis Example 1: A-1

A solution was prepared by mixing 300 ml of water, 4 ml of ammonium hydroxide, 20 ml of ethylene glycol monoethyl ether, and 40 ml of ethanol. 2 g of hexadecyltrimethylammonium bromide (CTAB) was added to the solution and dissolved, then stirred at room temperature at a speed of 250 rpm for 30 minutes to prepare a mixed solution.

38.38 g of triethoxysilane (TEOS) was added to the mixed solution and stirred at room temperature at a speed of 250 rpm for 5 minutes. Then, 1.76 g of triethylphosphate (TEP) was added thereto and stirred at room temperature at a speed of 250 rpm for 5 minutes. Thereafter, 4 g of calcium nitrate tetrahydrate was added and stirred at room temperature at a speed of 250 rpm for 3 hours, followed by filtration under reduced pressure to obtain a solid precipitate.

The obtained precipitate was sequentially washed with distilled water, ethanol and distilled water, respectively, and filtered. Thereafter, the filtered precipitate was dried in an oven at 60° C. for 24 hours, and heated to 700° C. under a heating condition of 2° C./min, then calcined at 700° C. for 3 hours. Thereafter, the calcined precipitate was cooled to prepare 9.74 g of porous glass nanoparticles (A-1).

The prepared porous glass nanoparticles were put into a BET measuring device (ASAP 2020, AutoChem II, Micromeritics Instrument Corp), and a specific surface area, a pore volume, and an average pore size were measured by a nitrogen gas adsorption distribution method.

The specific surface area, pore volume and average pore size of the prepared porous glass nanoparticles are as follows.

Specific surface area: 665.09 $m^2/g$, pore volume: 0.31 $cm^3/g$, and pore size: 5.78 nm.

Synthesis Example 2: A-2

Porous glass nanoparticles (A-2) were prepared according to the same procedures as described in Synthesis Example 1, except that 40.14 g of triethoxysilane (TEOS), 1.76 g of triethyl phosphate (TEP), and 2 g of calcium nitrate tetrahydrate were added to the mixed solution of Synthesis Example 1.

The specific surface area, pore volume and average pore size of the prepared porous glass nanoparticles are as follows.

Specific surface area: 453.18 $m^2/g$, pore volume: 0.64 $cm^3/g$, and pore size: 8.94 nm.

Synthesis Example 3: A-3

Porous glass nanoparticles (A-3) were prepared according to the same procedures as described in Synthesis Example 1, except that 17.42 g of triethoxysilane (TEOS), 0.88 g of triethyl phosphate (TEP), and 4 g of calcium nitrate tetrahydrate were added to the mixed solution of Synthesis Example 1.

The specific surface area, pore volume and average pore size of the prepared porous glass nanoparticles are as follows.

Specific surface area: 552.10 $m^2/g$, pore volume: 0.30 $cm^3/g$, and pore size: 2.78 nm.

Synthesis Example 4: A-4

A solution was prepared by mixing 100 ml of water, 4 ml of ammonium hydroxide and 20 ml of ethanol.

38.38 g of triethoxysilane (TEOS) and 1.76 g of triethyl phosphate (TEP) were added to the mixed solution, then the mixture was stirred at room temperature at a speed of 250 rpm for 5 minutes. Thereafter, 4 g of calcium nitrate tetrahydrate was added and stirred at room temperature at a speed of 250 rpm for 3 hours, followed by filtration under reduced pressure to obtain a solid precipitate.

Thereafter, the obtained precipitate was washed and filtered according to the same procedures as described in Synthesis Example 1 to prepare porous glass nanoparticles (A-4). The specific surface area, pore volume and average pore size of the prepared porous glass nanoparticles are as follows.

Specific surface area: 56.22 m²/g, pore volume: 0.18 cm³/g, and pore size: 12.99 nm.

Synthesis Example 5: A-5

A solution was prepared by mixing 150 ml of water, 4 ml of ammonium hydroxide, 10 ml of ethylene glycol monoethyl ether and 20 ml of ethanol.

38.38 g of triethoxysilane (TEOS) and 1.76 g of triethyl phosphate (TEP) were added to the mixed solution, then the mixture was stirred at room temperature at a speed of 250 rpm for 5 minutes. Thereafter, 4 g of calcium nitrate tetrahydrate was added and stirred at room temperature at a speed of 250 rpm for 3 hours, followed by filtration under reduced pressure to obtain a solid precipitate.

Thereafter, the obtained precipitate was washed and filtered according to the same procedures as described in Synthesis Example 1 to prepare porous glass nanoparticles (A-5). The specific surface area, pore volume and average pore size of the prepared porous glass nanoparticles are as follows.

Specific surface area: 52.39 m²/g, pore volume: 0.16 cm³/g, and pore size: 12.53 nm.

Synthesis Example 6: A-6

A solution was prepared by mixing 300 ml of water, 4 ml of ammonium hydroxide, 20 ml of ethylene glycol monoethyl ether and 40 ml of ethanol.

38.38 g of triethoxysilane (TEOS) and 1.76 g of triethyl phosphate (TEP) were added to the mixed solution, then the mixture was stirred at room temperature at a speed of 250 rpm for 5 minutes. Thereafter, 4 g of calcium nitrate tetrahydrate was added and stirred at room temperature at a speed of 250 rpm for 3 hours, followed by filtration under reduced pressure to obtain a solid precipitate.

Thereafter, the obtained precipitate was washed and filtered according to the same procedures as described in Synthesis Example 1 to prepare porous glass nanoparticles (A-6). The specific surface area, pore volume and average pore size of the prepared porous glass nanoparticles are as follows.

Specific surface area: 85.45 m²/g, pore volume: 0.42 cm³/g, and pore size: 20.15 nm.

EXAMPLES AND COMPARATIVE EXAMPLES

Examples

Dentin adhesive compositions were prepared by mixing the components described in Table 1 below in corresponding amounts (wt. %).

Specifically, an acidic monomer was added to a composition containing a polymerizable monomer and stirred at about 80 to 100 rpm at room temperature (25° C.) for 2 hours. Then, a photo-initiator, a reducing agent, an antioxidant and a pH adjuster were added and stirred at 80 to 100 rpm at room temperature for 2 hours. Thereafter, the porous glass nanoparticles prepared in the synthesis examples were added and stirred at room temperature at 80 to 100 rpm for 1 hour, then a solvent was added thereto to prepare dentin adhesive compositions, respectively.

TABLE 1

| Division (wt. %) | Example 1 | Example 2 | Example 3 | Example 4 | Example 5 | Example 6 | Example 7 | Example 8 |
| --- | --- | --- | --- | --- | --- | --- | --- | --- |
| Glass nanoparticles (A) | 0.2 (A-1) | 0.5 (A-1) | 1 (A-1) | 2 (A-1) | 5 (A-1) | 5 (A-1) | 1 (A-2) | 1 (A-3) |
| Polymerizable monomer (B) | 62 | 62 | 65 | 65 | 65 | 60 | 62 | 62 |
| Acidic monomer (C) | 6 | 6 | 7 | 7 | 7 | 6 | 6 | 6 |
| Photo-initiator (D) | 0.5 | 0.5 | 0.5 | 0.5 | 0.5 | 0.5 | 0.5 | 0.5 |
| Reducing agent (G) | 1 | 1 | 1 | 1 | 1 | 1 | 1 | 1 |
| Antioxidant (F) | 0.25 | 0.25 | 0.25 | 0.25 | 0.25 | 0.25 | 0.25 | 0.25 |
| pH adjuster (G) | 0.25 | 0.25 | 0.25 | 0.25 | 0.25 | 0.25 | 0.25 | 0.25 |
| Solvent (H) | 29.6 | 29 | 24 | 22 | 16 | 22 | 28 | 28 |
| Silane coupling agent (I) | 0.2 | 0.5 | 1 | 2 | 5 | 5 | 1 | 1 |

COMPARATIVE EXAMPLES

Dentin adhesive compositions were prepared in the same manner as in the examples by mixing the components described in Table 2 below in corresponding amounts 5 (wt. %).

TABLE 2

| Division (wt. %) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Glass nanoparticles (A) | 0.5 (A-4) | 1 (A-4) | 1 (A-5) | 1 (A-6) | 1 (A-7) | 1 (A-8) | 1 (A-9) | — |
| Polymerizable monomer (B) | 62 | 65 | 65 | 65 | 65 | 65 | 65 | 65 |
| Acidic monomer (C) | 6 | 7 | 7 | 7 | 7 | 7 | 7 | 7 |
| Photo-initiator (D) | 0.5 | 0.5 | 0.5 | 0.5 | 0.5 | 0.5 | 0.5 | 0.5 |
| Reducing agent (G) | 1 | 1 | 1 | 1 | 1 | 1 | 1 | 1 |
| Antioxidant (F) | 0.25 | 0.25 | 0.25 | 0.25 | 0.25 | 0.25 | 0.25 | 0.25 |
| pH adjuster (G) | 0.25 | 0.25 | 0.25 | 0.25 | 0.25 | 0.25 | 0.25 | 0.25 |
| Solvent (H) | 29 | 24 | 24 | 24 | 24 | 24 | 24 | 26 |
| Silane coupling agent (I) | 0.5 | 1 | 1 | 1 | 1 | 1 | 1 | — |

The specific component names described in Tables 1 and 2 are as follows.

Glass Nanoparticles (A)
1) A-1: Porous glass nanoparticles prepared in Synthesis Example 1
2) A-2: Porous glass nanoparticles prepared in Synthesis Example 2
3) A-3: Porous glass nanoparticles prepared in Synthesis Example 3
4) A-4: Porous glass nanoparticles prepared in Synthesis Example 4
5) A-5: Porous glass nanoparticles prepared in Synthesis Example 5
6) A-6: Porous glass nanoparticles prepared in Synthesis Example 6
7) A-7: Silica R7200 (specific surface area: 175 $m^2/g$)
8) A-8: Bioglass 45S5 (specific surface area: 1.011 $m^2/g$, pore volume: 0.0042 $cm^3/g$, and pore size: 16.546 nm)
9) A-9: Bioglass 63S (specific surface area: 164.703 $m^2/g$, pore volume: 0.429 $cm^3/g$, and pore size: 10.427 nm)

Polymerizable Monomer (B)
A mixture of bisphenol A-glycerolate methacrylate (bis-GMA)/urethane dimethacrylate (UDMA)/ethyleneglycol methacrylate (HEMA) (4/2/1, weight ratio)

Acidic Monomer (C)
10-methacryloyloxydecyl dihydrogen phosphate (10-MDP)

Photo-Initiator (D)
Camphorquinone (CQ)

Reducing Agent (E)
Ethyl-4-dimethylamino benzoate (EDMAB)

Antioxidants (F)
2,6-di-tert-butyl-4-methylphenol butylate (BHT)

Ph Adjuster (G)
2,2'-(p-tolylamino)-diethanol (TP)

Solvent (H)
Mixed solvent of ethanol/water (1/1, weight ratio)

Silane Coupling Agent (I)
Methacryloyloxy propyl trimethoxy silane (MPTMS)

Experimental Example (1) Evaluation of Dentinal Tubule Occluding Ability

A carious tooth within 3 months after tooth extraction was cut longitudinally into a size of 2 mm long and 2 mm wide, and the moisture on the cut surface was removed using air. Thereafter, using 37% phosphoric acid etchant (Dentto-Etch, Mediclus), the residue on the surface of the carious tooth was removed for 20 seconds, and then the carious tooth was washed with water to remove the phosphoric acid etchant. Subsequently, the moisture on the carious tooth was removed.

Thereafter, the porous glass nanoparticles listed in Table 3 below and deionized water were mixed and stirred to prepare a mixed solution containing 5 wt. % of the porous glass nanoparticles. The mixed solution was put on a micro brush and then applied to the dentin surface of the prepared carious tooth for 1 minute. Subsequently, the moisture on the carious tooth was removed with a towel to fabricate a specimen. The fabricated specimen was dried at room temperature for 24 hours and then precipitated in a platinum solution to coat the specimen with platinum.

The surface of the specimen was observed through SEM equipment to confirm whether the dentinal tubules of the specimen were occluded. Evaluation results are shown in Table 3 below. Standards for evaluation are as follows.

<Standards for Evaluation>
⊙: Dentinal tubules are completely covered
○: Greater than 50% of dentinal tubules are covered
Δ: Less than 50% of the dentinal tubules are covered
x: Dentinal tubules are not occluded

TABLE 3

| Glass nanoparticles | A-1 | A-2 | A-3 | A-4 | A-5 | A-6 | A-7 | A-8 | A-9 |
|---|---|---|---|---|---|---|---|---|---|
| Evaluation of dentinal tubule occluding ability | ◎ | ◎ | ◎ | Δ | Δ | Δ | Δ | × | Δ |

Referring to Table 3 above, in the case of porous glass nanoparticles A-1 to A-3 according to exemplary embodiments, it can be confirmed these nanoparticles have improved dentinal tubule occluding abilities due to the high specific surface area and pore volume thereof.

On the other hand, in the case of A-4 to A-9, it can be confirmed that the glass nanoparticles have deteriorated dentinal tubule occluding abilities due to the low specific surface area and pore volume thereof.

Figure 2A:
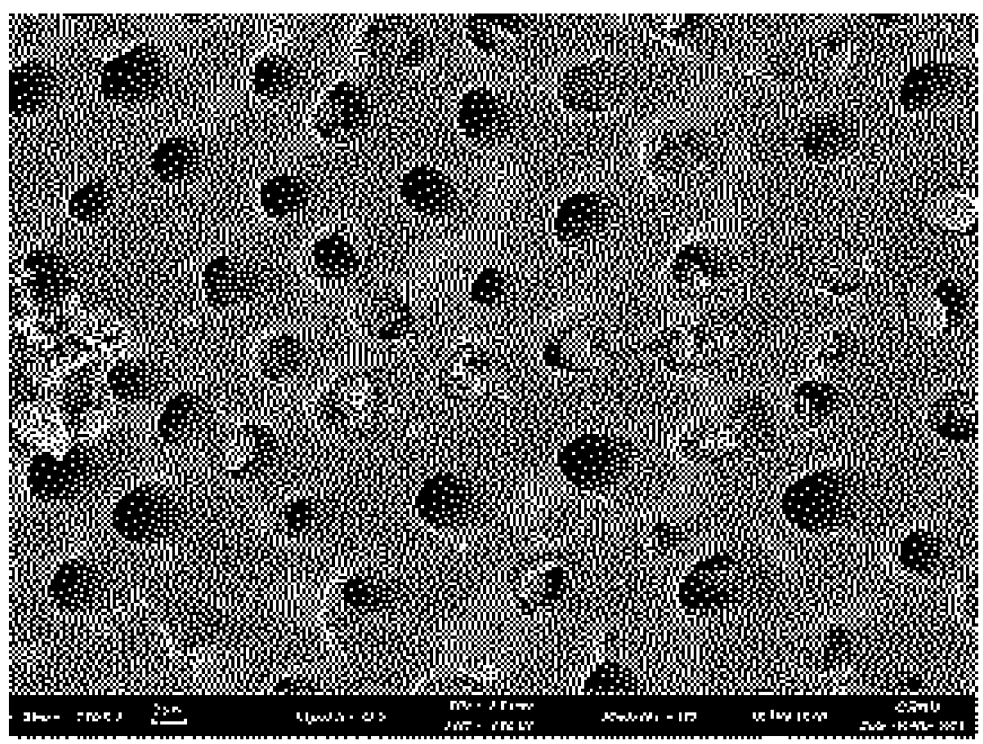
FIGS. 2A and 2B are SEM photographs taken by observing the dentin surface cured after applying a porous glass nanoparticle-containing aqueous solution according to Synthesis Example 4 of the present invention at 1000× magnification and 2000× magnification, respectively.

FIGS. 1A and 2A are scanning electron microscopy (SEM) photographs taken by observing the dentin surfaces cured after applying porous glass nanoparticle-containing aqueous solutions according to Synthesis Examples 1 and 4 of the present invention at 1000× magnification, respectively.

Figure 1B:
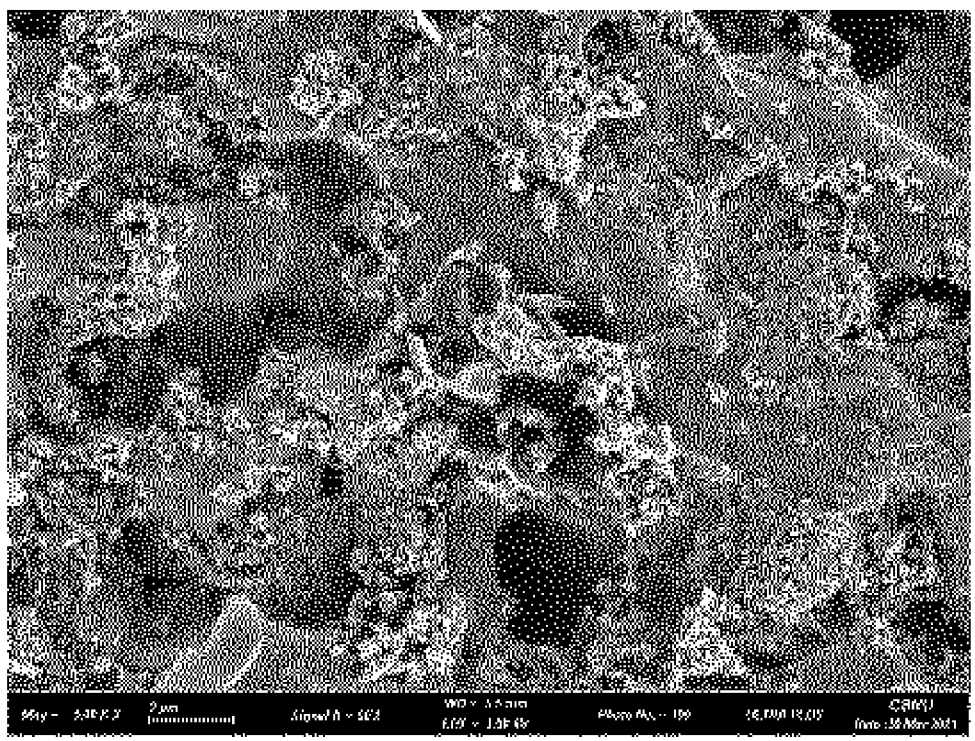
Figure 2B:
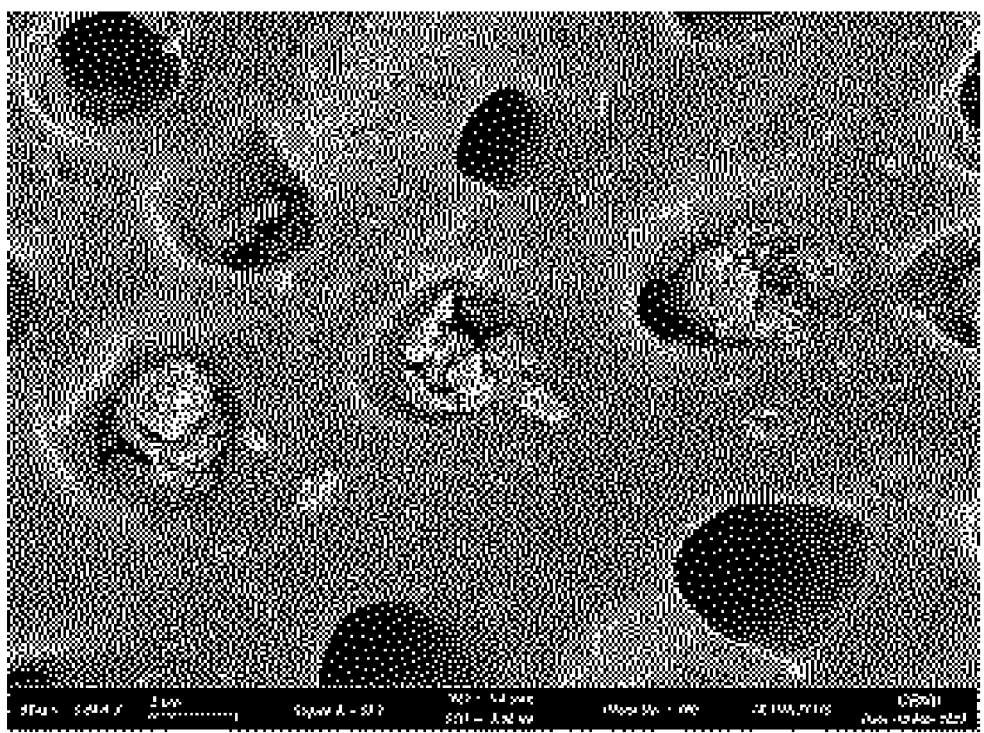

FIGS. 1B and 2B are scanning electron microscopy (SEM) photographs taken by observing dentin surfaces cured after applying the porous glass nanoparticle-containing aqueous solutions according to Synthesis Examples 1 and 4 of the present invention at 2000× magnification, respectively.

Referring to FIGS. 1A and 1B, in the specimen applied with the porous glass nanoparticles according to Synthesis Example 1, it can be confirmed that the dentinal tubules on the dentin surface are occluded. However, referring to FIGS. 2A and 2B, in the specimen applied with the porous glass nanoparticles according to Synthesis Example 4, it can be confirmed that a plurality of unoccluded dentinal tubules are present on the dentin surface.

(2) Measurement of Viscosity and pH

Viscosity and pH of the dentin adhesive compositions according to the examples and comparative examples were measured three times at room temperature (25° C.) using a viscometer (LVDV-E, Brookfield Viscometer) and a pH meter (TOA HM-7E, TOA Electrocin Ltd), respectively, then an average value was calculated by repeatedly performing the measurement 3 times.

Measurement results are shown in Table 4 below together.

(3) Evaluation of Micro-Tensile Bond Strength

A tensile strength was measured according to the method described in ISO 29022. The carious tooth within 3 months after tooth extraction was cut longitudinally into a size of 4 mm long and 4 mm wide. Thereafter, the cut surface was polished using P120 abrasive paper to expose the dentin surface to an outside, and then polished using P400 abrasive paper to make the surface of the cut surface be uniform. After washing the polished carious tooth with water, the surface was dried using air. Thereafter, the adhesive compositions according to the examples and comparative examples was put on a micro brush and then applied to the dentin surface of the carious tooth for 20 seconds. The applied adhesive composition was flattened using air and then photocured for 40 seconds at an intensity of 600 mW/cm² to prepare a specimen.

An adhesive strength of the prepared specimen was measured using a universal testing machine (UTM) under conditions of 23° C. and 50% RH at a tensile rate of 1.0 mm/min until fracture.

Evaluation results are shown in Table 4 below.

(4) Evaluation of Remineralization Ability

A carious tooth within 3 months after tooth extraction was cut longitudinally into a size of 2 mm long and 2 mm wide, and the moisture on the cut surface was removed using air. Thereafter, using 37% phosphoric acid etchant (Dentto-Etch, Mediclus), the residue on the surface of the carious tooth was removed for 20 seconds, and then the carious tooth was washed with water to remove the phosphoric acid etchant. Subsequently, the moisture on the carious tooth was removed.

The adhesive compositions according to the examples and comparative examples was put on a micro brush and then applied to the dentin surface of the carious tooth for 20 seconds. The applied adhesive composition was flattened using air and then photocured for 40 seconds at an intensity of 600 mW/cm² to prepare a specimen. The fabricated specimen was incubated in a simulated body fluid (SBF, 1×) in a thermostatic water bath at 37° C. for 3 days. Thereafter, the specimen was dried at room temperature (25° C.) for 24 hours and precipitated in a platinum solution to coat the specimen with platinum.

The surface of the specimen was observed through SEM equipment to determine whether a hydroxyapatite (HAp) layer was formed on the surface. Evaluation results are shown in Table 4 below. Standards for evaluation are as follows.

<Standards for Evaluation>
◎: HAp layer is formed on 40% or more of the dentin surface
○: HAp layer is formed on 20% or more to less than 40% of the dentin surface
Δ: HAp layer is formed on 10% or more to less than 20% of the dentin surface
×: HAp layer is formed on less than 10% of the dentin surface

TABLE 4

| Division (wt. %) | Viscosity (cP) | pH | Tensile strength (MPa) | Evaluation of remineralization ability |
|---|---|---|---|---|
| Example 1 | 18 | 3.09 | 17 | Δ |
| Example 2 | 23 | 3.08 | 18.5 | ○ |
| Example 3 | 25 | 3.05 | 20 | ○ |
| Example 4 | 38 | 3.18 | 26.25 | ◎ |
| Example 5 | 48 | 3.29 | 16.5 | ◎ |
| Example 6 | 29 | 3.02 | 24.25 | ◎ |
| Example 7 | 22 | 3.05 | 18.16 | ○ |
| Example 8 | 24 | 3.08 | 19.5 | ○ |
| Comparative Example 1 | 19 | 3.30 | 13.13 | X |
| Comparative Example 2 | 26 | 3.32 | 15.23 | Δ |
| Comparative Example 3 | 23 | 3.24 | 13.65 | Δ |
| Comparative Example 4 | 26 | 3.24 | 11.38 | Δ |
| Comparative Example 5 | 29 | 3.19 | 14.18 | Δ |
| Comparative Example 6 | 41 | 4.76 | 7.85 | Δ |
| Comparative Example 7 | 42 | 4.2 | 14.65 | Δ |
| Comparative Example 8 | 15 | 3.2 | 10.85 | X |

Referring to Table 4 above, in the case of the dentin adhesive compositions including porous glass nanoparticles according to exemplary embodiments, it can be confirmed that the active particles have high specific surface area and pore volume, thereby these compositions have improved dentin remineralization property and dentinal tubule occluding ability.

In addition, by including the porous glass nanoparticles having a high pore volume, formation of the hydroxyapatite (HAp) may be facilitated. In addition, by forming a cross-linking network between a polymerizable compound inserted into the pores of the porous glass nanoparticles and the dentinal tubules, a plug may be formed. Accordingly, it can be confirmed that the cured product has improved adhesive strength to the dentin surface.

On the other hand, in the case of the dentin adhesive compositions including porous glass nanoparticles having a low specific surface area of the comparative examples, it can be confirmed that it is not easy to supply/release inorganic components due to the glass nanoparticles, thereby the remineralization property and dentinal tubule occluding ability are deteriorated.

In addition, in the case of the comparative examples, it can be confirmed that, as the porous glass nanoparticles have a low pore volume, the adhesive strength at the dentin interface is reduced. In the case of Comparative Example 8, it can be confirmed that, since the composition does not include the glass nanoparticles, the remineralization property of dentin and the dentinal tubule occluding ability are notably deteriorated.

Figure 3A:
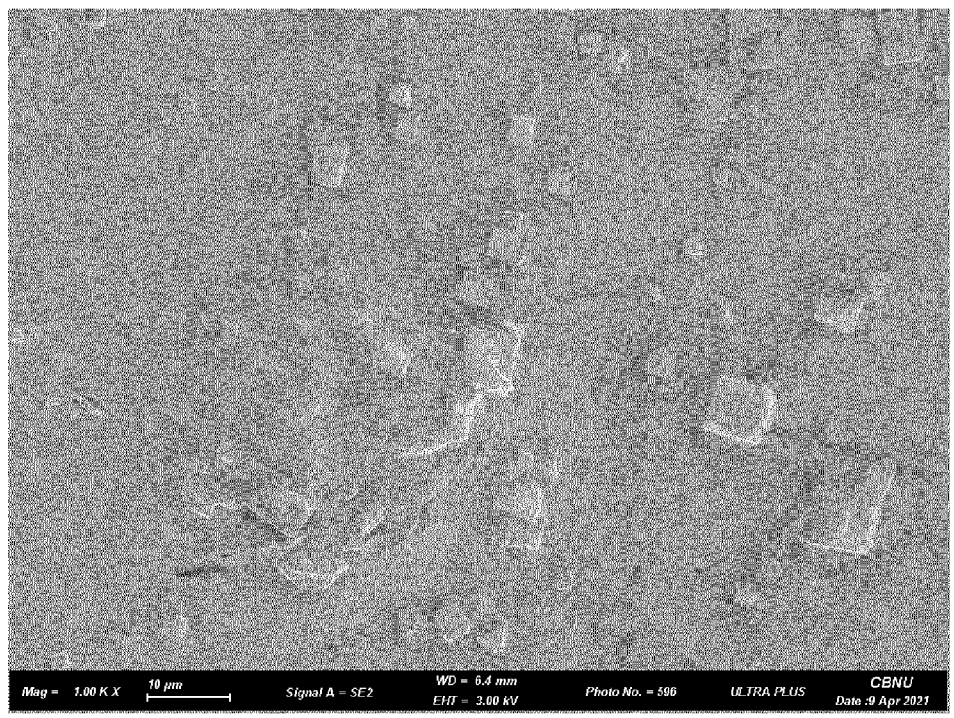
FIGS. 3A and 3B are SEM photographs taken by observing the dentin surface cured after applying a dentin adhesive composition according to Example 4 of the present invention at 1000× magnification and 2000× magnification, respectively.
Figure 4A:
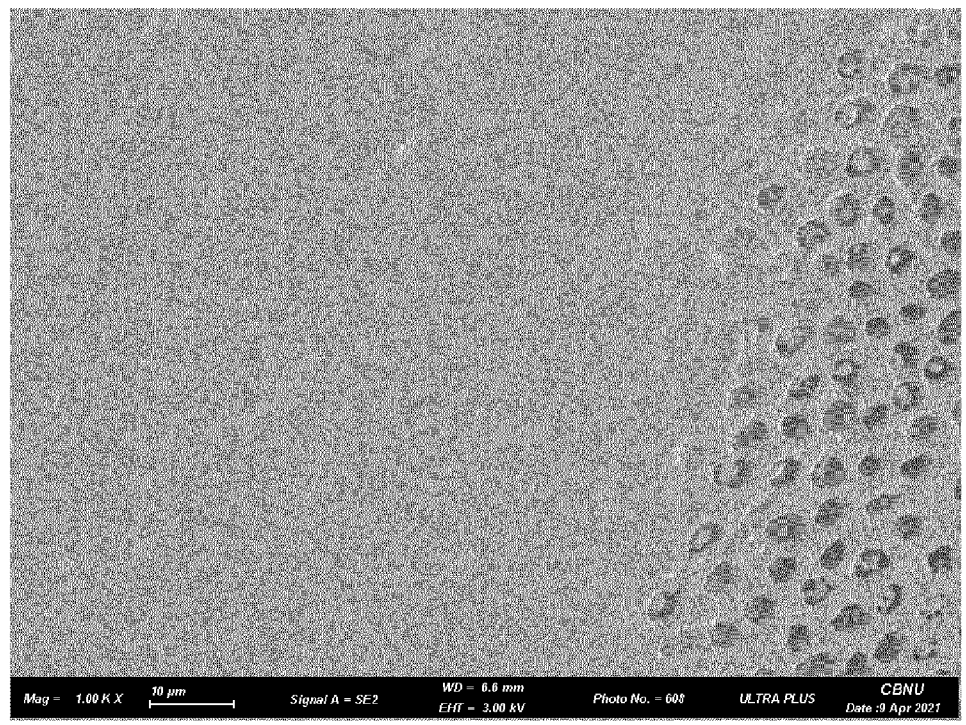
FIGS. 4A and 4B are SEM photographs taken by observing the dentin surface cured after applying a dentin adhesive composition according to Comparative Example 8 of the present invention at 1000× magnification and 2000× magnification, respectively.

FIGS. 3A and 4A are scanning electron microscopy (SEM) photographs taken by observing the dentin surface cured after applying dentin adhesive compositions according to Example 4 and Comparative Example 8 at 1000× magnification, respectively.

Figure 3B:
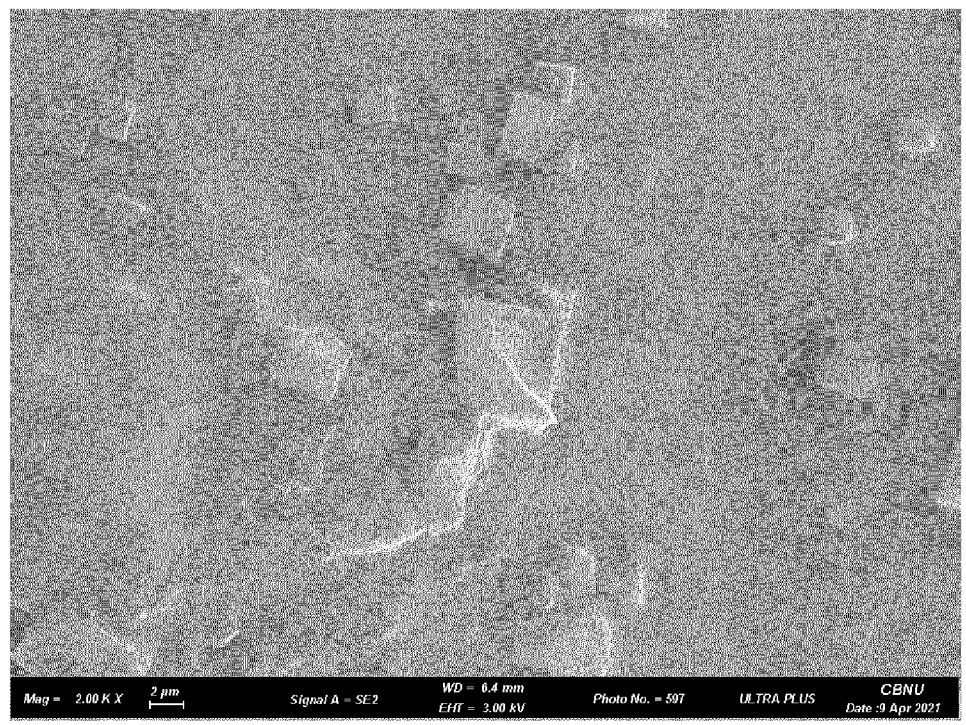
Figure 4B:
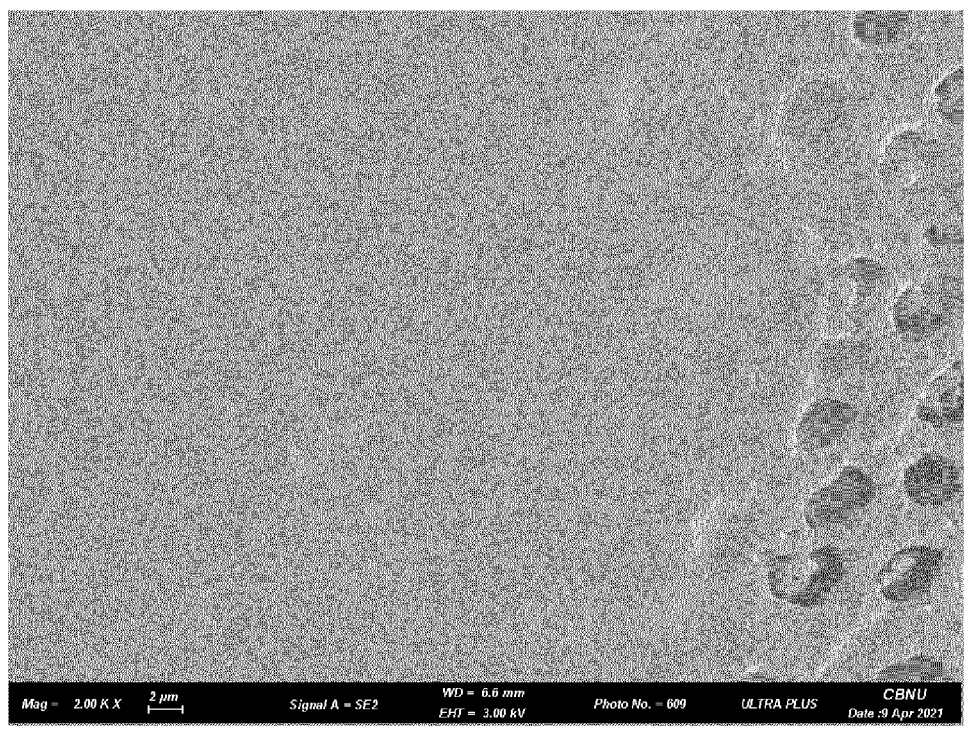

FIGS. 3B and 4B are scanning electron microscopy (SEM) photographs taken by observing the dentin surface cured after applying dentin adhesive compositions according to Example 4 and Comparative Example 8 at 2000× magnification, respectively.

Referring to FIGS. 3A and 3B, in the case of the specimen using the dentin adhesive composition according to Example 1 of the present invention, it can be confirmed that an amorphous hydroxyapatite layer was formed on the surface. However, referring to FIGS. 4A and 4B, in the case of the specimen using the dentin adhesive composition of Comparative Example 8, no hydroxyapatite layer was observed.

What is claimed is:

1. Porous glass nanoparticles having a specific surface area of 250 m2/g to 800 m2/g, and a pore volume of 0.1 cm3/g to 1 cm3/g.

2. The porous glass nanoparticles according to claim 1, wherein pores of the porous glass nanoparticles have an average diameter of 2 nm to 50 nm.

3. The porous glass nanoparticles according to claim 2, wherein the pores having a diameter of 5 nm to 20 nm are included in 50% or more of all pores of the porous glass nanoparticles.

4. The porous glass nanoparticles according to claim 1, wherein the porous glass nanoparticles have an average particle diameter (D50) of 30 nm to 100 nm.

5. The porous glass nanoparticles according to claim 1, comprising at least one selected from the group consisting of Si, Ca, Cu, Mg, Na, K, P, Al, B and F.

6. The porous glass nanoparticles according to claim 5, comprising at least one selected from the group consisting of $SiO_2$, CaO, CuO, MgO, $Na_2O$, $K_2O$, $P_2O_5$, $Al_2O_3$, $B_2O_3$, NaF and $CaF_2$.

7. The porous glass nanoparticles according to claim 1, wherein the porous glass nanoparticles are surface-modified with a silane group or an amine group (—$NH_2$).

8. A dentin adhesive composition comprising the porous glass nanoparticles according to claim 1, an acidic monomer, a polymerizable monomer and a photo-initiating system.

9. The dentin adhesive composition according to claim 8, wherein the acidic monomer has at least one of a carboxyl group, a sulfonic acid group, a phosphoric acid group and an acid anhydride group.

10. The dentin adhesive composition according to claim 8, wherein the polymerizable monomer includes a (meth) acrylate compound.

11. The dentin adhesive composition according to claim 8, wherein the photo-initiating system comprises a photo-initiator and a reducing agent.

12. The dentin adhesive composition according to claim 11, wherein the photo-initiating system includes the photo-initiator and the reducing agent in a weight ratio of 20:80 to 80:20.

13. The dentin adhesive composition according to claim 8, wherein a content of the porous glass nanoparticles is 0.01% to 15% by weight based on a total weight of the dentin adhesive composition.

14. The dentin adhesive composition according to claim 13, wherein the dentin adhesive composition comprises:
   0.1% to 20% by weight of the acidic monomer:
   30% to 80% by weight of the polymerizable monomer; and
   0.1% to 5% by weight of the photo-initiating system, based on the total weight thereof.

15. The dentin adhesive composition according to claim 8, further comprising at least one of a silane coupling agent, a pH adjuster, an antioxidant and a solvent.

16. The dentin adhesive composition according to claim 8, wherein the dentin adhesive composition has a viscosity of 10 cP to 40 cP at 25° C.

17. The dentin adhesive composition according to claim 8, wherein the dentin adhesive composition has a pH of 2 to 5.

* * * * *